United States Patent
Brady

(10) Patent No.: US 12,092,557 B2
(45) Date of Patent: Sep. 17, 2024

(54) APPARATUS AND METHODS FOR THE QUALITATIVE AND QUANTITATIVE DETECTION OF AMPHIPHILES

(71) Applicant: EZRATERRA, LLC, Bend, OR (US)

(72) Inventor: Patrick Richard Brady, Sisters, OR (US)

(73) Assignee: EZRATERRA, LLC, Sisters, OR (US)

( * ) Notice: Subject to any disclaimer, the term of this patent is extended or adjusted under 35 U.S.C. 154(b) by 562 days.

(21) Appl. No.: 17/214,431

(22) Filed: Mar. 26, 2021

(65) Prior Publication Data

US 2022/0307961 A1  Sep. 29, 2022

(51) Int. Cl.
*G01N 13/02* (2006.01)

(52) U.S. Cl.
CPC ..... *G01N 13/02* (2013.01); *G01N 2013/0208* (2013.01); *G01N 2013/0283* (2013.01)

(58) Field of Classification Search
CPC ........... G01N 13/02; G01N 2013/0208; G01N 2013/0283
See application file for complete search history.

(56) References Cited

U.S. PATENT DOCUMENTS

| | | |
|---|---|---|
| 9,816,909 B2 | 11/2017 | Friedrich |
| 10,875,062 B2 | 12/2020 | Brady |
| 2004/0082494 A1* | 4/2004 | Queval ............... C08F 8/12 510/475 |
| 2020/0206793 A1 | 7/2020 | Brady |

FOREIGN PATENT DOCUMENTS

EP  2899528 A1  7/2015

OTHER PUBLICATIONS

Thomsen. F, Dec. 2008, Krüss, Technical note, TN315e, pp. 1-6 (Year: 2008).*
Hyde, F. Comparison of fluorinated polymers against stainless steel, glass and polypropylene in microbial biofilm adherence and removal, 1997, Journal of Industrial Microbiology and Biotechnology, 19, pp. 142-149. (Year: 1997).*

* cited by examiner

*Primary Examiner* — Jill A Warden
*Assistant Examiner* — Alex Ramirez
(74) *Attorney, Agent, or Firm* — Raven Patents, LLC; Anton E. Skaugset

(57) ABSTRACT

Methods, apparatus, and kits for detecting and optionally quantifying amphiphilic compounds in the environment, in media samples, and on objects by determining an initial surface energy of a surface of a sample substrate, exposing the sample substrate surface to a medium that contains or is suspected to contain an amphiphilic compound for a time sufficient for the amphiphilic compound to interact with the sample substrate surface, determining a post-exposure surface energy of the surface of the sample substrate, determining a change in the surface energy of the sample substrate surface, and correlating the determined change in surface energy of the sample substrate surface with a presence and/or character of amphiphilic compounds in the medium.

13 Claims, 6 Drawing Sheets

APPARATUS AND METHODS FOR THE QUALITATIVE AND QUANTITATIVE DETECTION OF AMPHIPHILES

TECHNICAL FIELD

This disclosure relates to apparatus for, and methods of, detection of amphiphilic compounds. In particular, the disclosure relates to apparatus and methods for detecting and/or quantifying the presence of amphiphiles such as poly- and perfluoroalkyl substances.

BACKGROUND

Per- and polyfluoroalkyl substances (PFAS, or perfluorinated alkylated substances) include thousands of different synthetic organofluorine compounds that feature multiple fluorine atoms attached to an alkyl chain. PFASs typically include at least one perfluoroalkyl moiety, an alkyl chain in which every hydrogen atom has been replaced by fluorine.

PFAS, and in particular perfluorinated surfactants, can exhibit highly useful physical properties and so are commonly used in a wide variety of industries including electronics, manufacturing, plastic and rubber production, food production, textile production, firefighting, medicine, and building and construction. PFAS are also found in many consumer products. In addition to consumer and occupational exposures, because our national waste management infrastructure was not designed to contain or remove PFAS, they have largely passed into the environment unabated.

PFAS are typically released into the environment as components of complex chemical systems that contain many other compounds. PFAS are typically employed in such formulations to manipulate surface energies and create thermodynamically stable mixtures designed for a variety of tasks. These formulations are typically invisible to traditional investigative methods.

PFAS releases are currently investigated as a classic solute transport problem for individual compounds. The functionality of these PFAS formulations and the electronic footprint these formulations leave on the environment is not currently evaluated as part of a traditional subsurface investigation.

The majority of environmental PFAS contamination is subsurface and occurs as reconstituted PFAS stabilized microemulsion films situated at the top of a depressed capillary fringe. Most of the contaminant mass, around 85%, is held as surface excess contained in this microemulsion film where it slowly and reliably delivers contaminants through the residual capillary fringe to the phreatic surface of the water table. Once present in groundwater, PFAS and other compounds cause groundwater flow to accelerate. PFAS groundwater plumes are typically large dilute plumes that can be miles long.

For example, Aqueous Film Forming Foam (AFFF) has been used for decades to extinguish liquid hydrocarbon fires. Selected PFAS are critical components of AFFF; PFAS is the electronic glue holding AFF together. Live firefighting practice exercises as well as actual firefighting activity has resulted in significant PFAS groundwater contamination. Unfortunately, since AFFF formulations include drag reductants, surfactants, and chaotropic agents that all cause groundwater flow to accelerate, PFAS groundwater plumes move faster and go further (several miles) than more conventional environmental contaminants, resulting in extremely large, dilute, commingled plumes.

Complicating the ubiquitous nature of PFAS contamination, the current regulatory environment requires cleanup goals for PFAS to be set at extremely low levels. In some cases, the cleanup goal is at a level that is below background concentrations, where the background concentrations are caused by a multitude of minor sources like sewer line leaks, aerial spraying for mosquitoes, and the like.

What is needed is a more sensitive method of detecting invisible PFAS films and defining groundwater source structures and associated plumes of PFAS. Areas believed to be free of PFAS soil contamination commonly reveal significant PFAS-contaminated soil upon excavation, due to the entrainment of the undetected PFAS films. A more reliable method of field analysis for PFAS-contaminated media is needed in order to facilitate excavation projects in PFAS contaminated areas, making them more discerning and efficient.

A detection method employing macro sampling and analysis of excavated soil in real time using surface energy data is also needed to map and remove PFAS groundwater source structures. Surface energy data can be collected from an emissions system connected to a soil treatment apparatus designed to non-destructively remove PFAS. PFAS source structures are substantially smaller than their associated plumes, but the detection, identification and removal of PFAS groundwater source structures can both protect susceptible water supply wells and provide a means to resolve litigation due to the presence of entangled and commingled PFAS plumes. Source removal and measurement isolates responsibility for responsible parties, which is important for resolving the extensive PFAS plumes that exist today.

In addition, equipment used to process contaminated media can become contaminated itself. In particular, metallic objects that contact PFAS-contaminated media become contaminated with PFAS themselves. PFAS microemulsions create Langmuir-Blodgett films that coat metallic objects. The accurate detection and proper decontamination of these PFAS microemulsion films can prevent undesirable cross-contamination. The extremely high toxicity of PFAS, even at low concentrations, make decontamination of contaminated objects a significant issue. Baseline surface energy data such as dynamic surface energy can be measured prior to use in a PFAS-contaminated area and used as a basis for evaluating decontamination effectiveness, and the achievement of decontamination benchmarks and goals.

SUMMARY

The present disclosure is directed to methods, apparatus, and kits for detecting and optionally quantifying amphiphilic compounds in the environment, in media samples, and on objects.

In one example the disclosure provides methods of analyzing a sample medium, the methods including determining an initial surface energy of a surface of a sample substrate, exposing the sample substrate surface to a medium that contains or is suspected to contain an amphiphilic compound for a time sufficient for the amphiphilic compound to interact with the sample substrate surface, determining a post-exposure surface energy of the surface of the sample substrate, determining a change in surface energy of the sample substrate surface by comparing the determined initial surface energy to the determined post-exposure surface energy, and correlating the determined change in surface energy of the sample substrate surface with a presence of amphiphilic compounds in the medium.

In another example, the disclosure provides methods of environmental mapping of PFAS contaminants, the methods including collecting a plurality of environmental samples, each environmental sample being associated with a location where it was collected, and for each environmental sample determining an initial surface energy of a surface of a sample substrate, exposing the sample substrate surface to the environmental sample for a time sufficient for any amphiphilic compounds in the environmental sample to interact with the sample substrate surface, determining a post-exposure surface energy of the surface of the sample substrate, determining a change in surface energy of the sample substrate surface by comparing the determined initial surface energy to the determined post-exposure surface energy, correlating the determined change in surface energy of the sample substrate surface with a presence of amphiphilic compounds in the environmental medium, and correlating the presence of amphiphilic compounds in each of the plurality of environmental samples with the location where that environmental sample was collected to map a presence of amphiphilic compounds in those locations.

In another example, the disclosure provides kits for analyzing sample media for a presence and/or character of amphiphilic compounds, including a plurality of sample substrates where each sample substrate has a surface capable of interacting with amphiphilic compounds in a sample medium, and a surface energy measurement device configured to determine a surface energy of the surface of each sample substrate.

The features, functions, and advantages of the disclosed methods and apparatus may be achieved independently in various embodiments of the present disclosure, or may be combined in yet other embodiments, further details of which can be seen with reference to the following description and drawings.

DETAILED DESCRIPTION OF PREFERRED EMBODIMENTS

When a solid material is cut or cleaved to create a surface, the three-dimensional network of intermolecular bonds within the solid material is disrupted, and the surface area is increased. As a result, the molecules at the solid surface have more energy relative to the molecules in the bulk of the material. This creates a "surface energy", which may be related to the "excess energy" due to the now-incomplete, unrealized bonding at the surface. This surface energy is often reduced by processes such as passivation, or adsorption, where an additional material binds to the surface, thereby modifying the energetic properties of the surface molecules.

Figure 1:
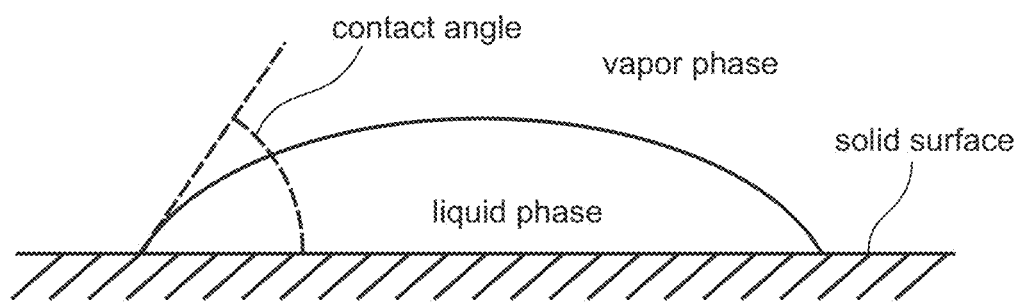
FIG. 1 is a diagram showing the measurement of a contact angle between a droplet of liquid and the surface it is resting upon.

The energy of a surface can be measured directly. The most common way to measure surface energy is through the measurement of contact angles. A contact angle is the angle defined by a liquid-vapor interface where a drop of liquid meets a solid surface, as shown in FIG. 1, and reflects the relative strength of the interactions between the liquid, the solid, and the vapor. Where a liquid has a high degree of surface tension, such as water, and the surface is relatively nonpolar, measured contact angles can be very high. Alternatively, a drop of nonpolar liquid on a nonpolar surface will typically spread out, exhibiting a very low contact angle.

The measured surface energy of a substance is typically a product of two types of interactions with the surface: Polar interactions, and dispersive interactions. Polar interactions are due to Coulomb interactions between permanent dipoles and between permanent and induced dipoles (e.g. hydrogen bonds), while dispersive interactions are caused by temporary fluctuations of charge distribution in the atoms/molecules involved (i.e. van der Waals interaction). The surface energy of surface 26 can therefore be expressed by the formula:

$$\sigma_t = \sigma_p + \sigma_d$$

where $\sigma_t$ is the measured total surface energy of a surface as determined experimentally, $\sigma_p$ is the polar component of the surface energy, and a is the dispersive component of the surface energy. These components of total surface energy are typically calculated by measuring and/or evaluating contact angles determined for both polar and non-polar liquids on the surface under evaluation.

Amphiphilic compounds have a tendency to undergo self-assembly on high energy surfaces, due largely to Coulombic interactions, and can created ordered layers or films on the surface. The surface energy of a given surface will decrease or increase and exhibit altered characteristics (changes in relative polar and dispersive portions of total surface energy) after being covered by such self-assembled amphiphilic structures.

The media analysis methods disclosed herein involve measuring the surface energy of a clean substrate having relatively high surface energy by measurement of contact angles at that surface. The substrate can then be exposed to a substance or media that contains, or is suspected to contain, amphiphilic compounds. If amphiphilic compounds are present in the media, then they should spontaneously adsorb onto the high energy surface of the substrate, changing the surface energy characteristics of the substrate surface. Contact angle measurement of the substrate surface before and after such exposure can then provide qualitative or quantitative information about the amount of amphiphilic compounds in the media, and even the nature of functional groups responsible for the formation of self-assembled amphiphilic films.

The media analysis methods disclosed herein have particular utility where the amphiphilic compounds are or include PFAS.

Method of Media Analysis

Figure 2:
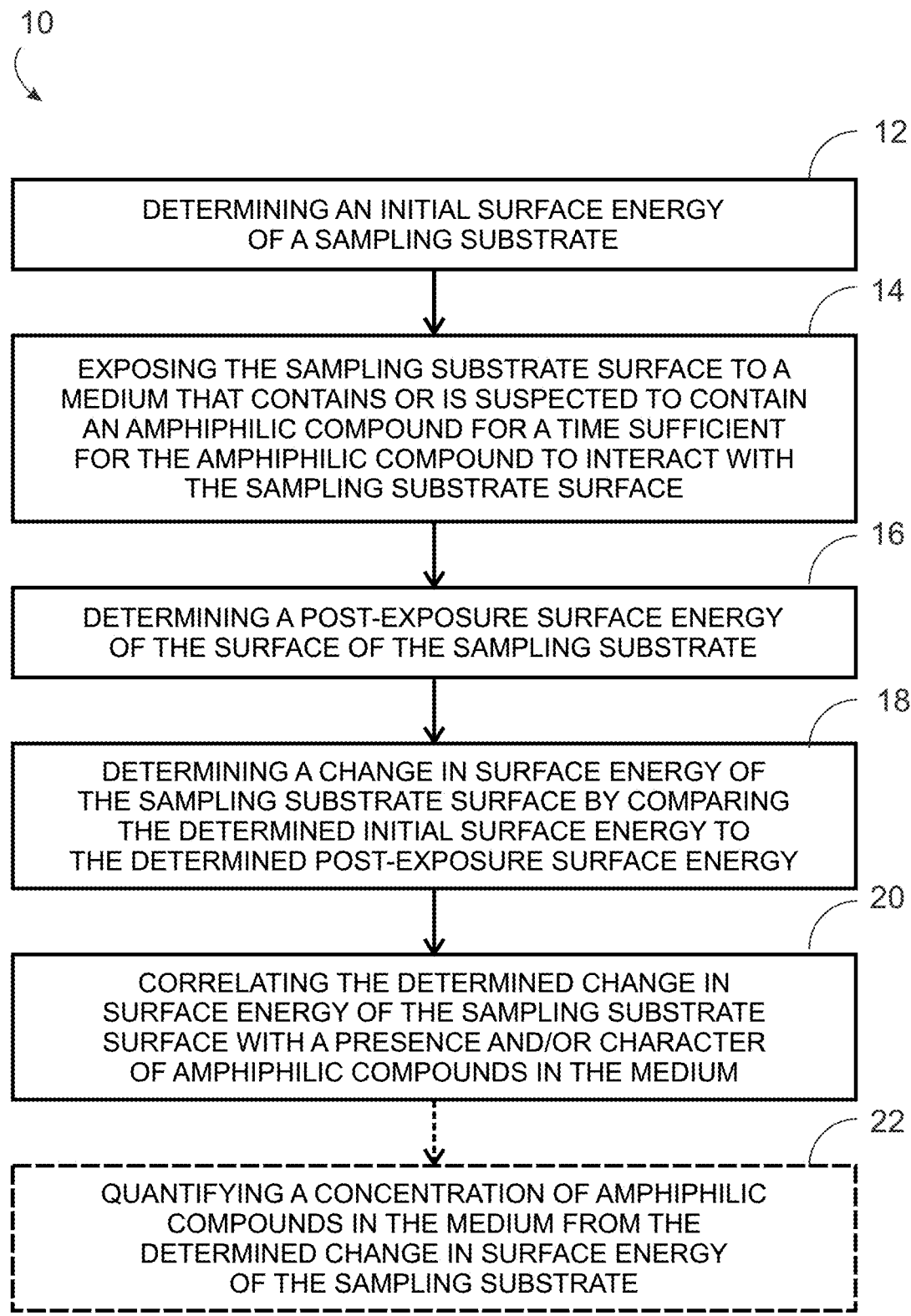
FIG. 2 is a flowchart illustrating an illustrative method of analyzing a sample medium, according to the present disclosure.

An illustrative method of analyzing a sample medium is shown in flowchart 10 of FIG. 2, which includes determining an initial surface energy of a surface of a sampling substrate, at step 12 of flowchart 10; exposing the sampling substrate surface to a medium that contains or is suspected to contain an amphiphilic compound for a time sufficient for the amphiphilic compound to interact with the sampling substrate surface, at step 14 of flowchart 10; determining a post-exposure surface energy of the surface of the sampling substrate, at step 16 of flowchart 10; determining a change in surface energy of the sampling substrate surface by comparing the determined initial surface energy and the determined post-exposure surface energy, at step 18 of flowchart 10; and correlating the determined change in surface energy of the sampling substrate surface with a presence and/or character of amphiphilic compounds in the medium, at step 20 of flowchart 10.

While the disclosed method can be used as a qualitative determination for the presence of amphiphilic compounds in a given sample medium, the method can additionally provide for the quantitative determination of the concentration of the amphiphilic compounds in the sample medium, at step 22 of flowchart 10.

Surface energy data can be evaluated through distinct changes in the character of the energy when compared to the base line energy conditions of the sample tab. Increases, decreases, and changes in the relative polar and dispersive contributions to surface energy can indicate the character of a self-assembled new surface. The complete data set can be temperature-adjusted and compared to itself to present a qualitative assessment of relative concentration. This method provides a view of contaminant intensity relative to surrounding media.

The methods of analyzing a sample medium as set forth in the present disclosure can have particular utility where the amphiphilic compounds are or include PFAS.

Sampling Substrate

Figure 3:
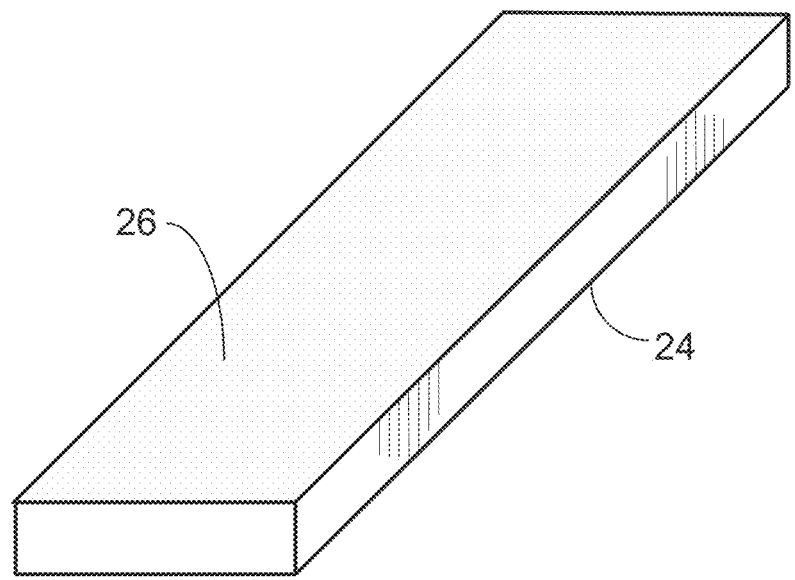
FIG. 3 depicts an illustrative sampling substrate, according to the present disclosure.

An illustrative sampling substrate 24 is shown in FIG. 3. Sampling substrate 24 can include any appropriate material for the measurement of contact angle data, and therefore surface energy data. Typically, sampling substrate 24 possesses at least one substantially flat surface 26 that is compatible with an analysis of that surface to determine its surface energy. That is, sampling substrate 24 is sized and shaped so as to be compatible with the instrument(s) selected for determining its surface energy, and surface 26 has a size and surface characteristics to facilitate the determination of surface energy of surface 26 by those instruments.

Although sampling substrate 24 is depicted as a rectangular prism or rectangular tablet, it should be appreciated that sampling substrate 24 can have any desired geometry, provided that it is sized and shaped appropriately to be substantially portable, compatible with use in combination with an appropriate instrument for measuring surface energy, and configured so as to be easily insertable into a medium that contains or is suspected to contain amphiphilic compounds.

The composition of sampling substrate 24 can be include any appropriate material, but is typically a material having a surface that has a high surface energy, such that changes of measured surface energy area readily detectable or determinable. In particular, a high initial surface energy permits downward changes in surface energy to be more readily detected and/or quantified. Typically, sampling substrate 24 is composed of a metal or metal alloy having an innately high energy surface. In one example, sampling substrate 24 is or includes copper metal.

Surface 26 of sampling substrate 24 is optionally treated so as to alter its surface characteristics in a desirable way. Any treatment that improves the performance of a given sampling substrate may be an appropriate treatment, including thermal treatment, physical treatment, or chemical treatment. In one example, a sampling substrate 24 that is or includes a metal can be heated under appropriate conditions to form a surface coating of metal oxide.

In particular, where sampling substrate 24 includes copper metal, the sampling substrate can be heated in the presence of oxygen to convert the copper surface to a black copper oxide (cupric oxide). The resulting oxide coating is chemically stable, very adherent, and well-suited to providing a baseline surface energy reference, as well as facilitating subsequent surface energy measurements.

As shown in FIG. 3, surface 26 of sampling substrate 24 represents an unexposed surface of the sampling substrate. That is, surface 26 is in a condition where sampling substrate 24 has not yet been in contact with a sample medium. A determination of the surface energy of surface 26 is therefore dependent only on the surface composition of sampling substrate 24, and therefore represents a surface energy baseline corresponding to the surface energy of surface 26 in the absence of any interaction with amphiphilic compounds.

Surface Energy Determination

The surface energy of surface 26 can be determined using any appropriate method, that is by using any instrument or device that can provide information regarding the surface energy of the sampling substrate surface before and after exposure of the sampling substrate to the sample being analyzed. In one aspect of the disclosure, the surface energy measurement device relies upon measurement of the contact angle of a drop of appropriate liquid on surface 26.

Measurement of a contact angle can quantify the wettability of a solid surface by the selected liquid. In particular, the value of the contact angle is dependent on the medium above the free surface of the liquid, and the nature of the liquid and solid that are in contact. As discussed above and as shown in FIG. 1, the contact angle is the angle exhibited by a liquid-air interface of a drop of liquid resting upon a surface, measured at the point at which the liquid surface meets the solid surface.

In one example, the measurement of the surface energy of a solid surface can be enhanced by measuring the contact angle of two or more different liquids on the surface. Typically, a droplet of a polar liquid and a droplet of a relatively nonpolar liquid will be applied to the surface of the sampling substrate, and the contact angle of each liquid droplet with the surface will be measured. By using two different droplets of differing polarities, additional information regarding the relative contributions of the polar component and dispersive component of the surface energy can be obtained. As an example, the two liquid droplets can include a water droplet and a droplet of a nonpolar solvent. More preferably, the two liquid droplets can include a water droplet and a droplet of diiodomethane.

By using the same sampling substrate 24 and the same set of liquids for the droplets, a measure of the contact angles before and after exposure of the sampling substrate 24 to a sample medium can provide the change in surface energy due to contact with that sample medium. Any observed changes in the measured contact angle can indicate changes in the energetic environment at surface 26, and more specifically, changes in the determined contact angle can provide information on the presence of, and amount of, amphiphilic compounds adsorbed onto the surface of the substrate, and therefore the presence of and amount of amphiphilic compounds present in the sample medium.

Figure 4:
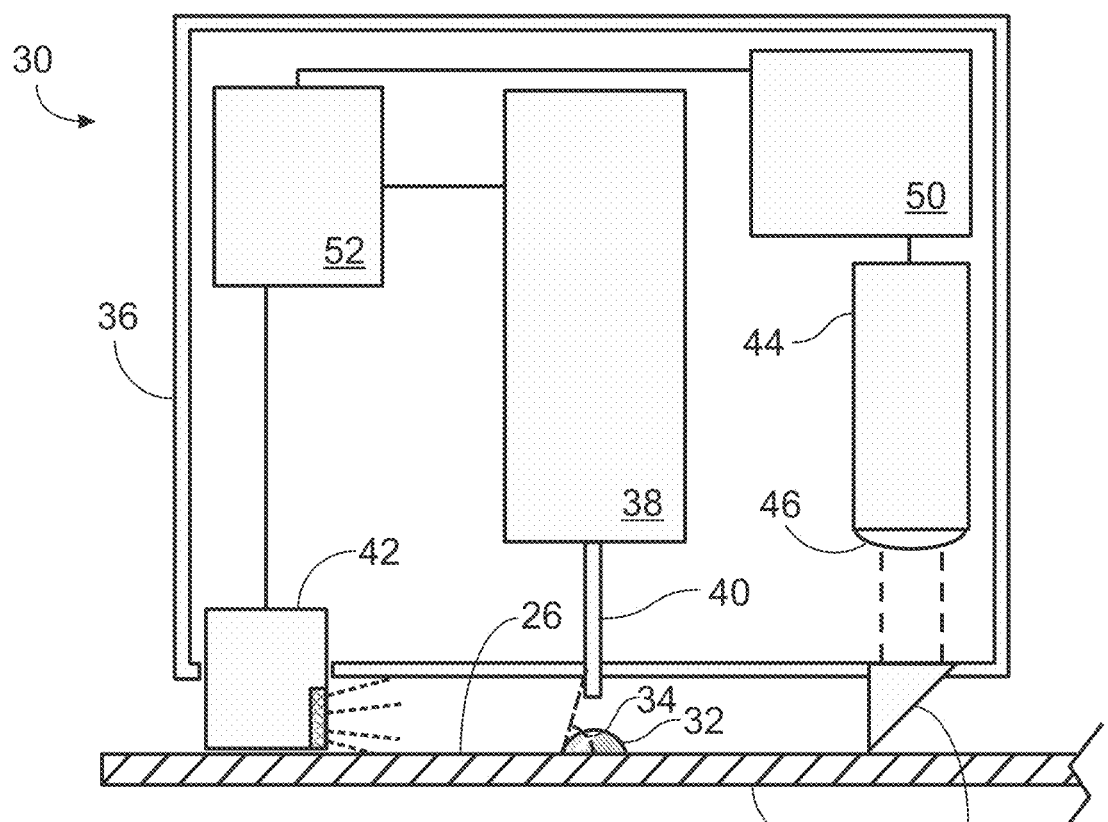
FIG. 4 is a semi-schematic sectional side view of an exemplary contact angle measurement apparatus useful for the disclosed method.

Although any contact angle measuring device can be used for such determinations, it is preferable that the contact angle measurement apparatus be relatively small and lightweight, so that it can be readily used in the field. An exemplary contact angle measurement apparatus useful in the context of the present disclosure was described by Friedrich et al. in U.S. Pat. No. 9,816,909 (hereby incorporated by reference for all purposes). A simplified depiction of such an appropriate contact angle measurement device 30 is shown semi-schematically in FIG. 4.

The contact angle measurement device 30 is shown in a schematic sectional side view resting upon surface 26 of a sampling substrate 24. Contact angle measurement device 30 is generally configured to apply one or more drops 32 of a selected liquid onto surface 26 of the sampling substrate 24, and to then determine a contact angle 34 of each drop 32 on surface 26.

The various components of contact angle measurement device 30 can be enclosed within or coupled to a housing 36, and can include one or more drop generators 38. Only a single drop generator 38 is visible in FIG. 4, but one or more additional drop generators may be located behind drop generator 38 so as to be aligned along the width of the contact angle measurement device 30. Each drop generator 38 can include a liquid reservoir and a system for dispensing a selected liquid from the liquid reservoir via a needle or cannula 40, such as for example a pressurized gas system.

Contact angle measurement device 30 typically further includes an illumination source 42 that is configured to illuminate the one or more drops 32. Illumination source 42 can include an appropriate light source, and optionally a light diffuser, in order to achieve a desired quality of illumination. For example, illumination source 42 can include one or more light-emitting elements such as light-emitting diodes (which may be the same or different) that can be independently actuated to provide more or less illumination, or to adjust the area under illumination.

Contact angle measurement device 30 can further include a camera system 44, optionally including a lens 46. Any orientation of camera system 44 that permits the capture of an image of the one or more drops 32 that are backlit by illumination source 42 can be an appropriate orientation. Typically contact angle measurement device 30 further includes a reflection element 48, such as a mirror or total-reflection prism, to direct the light generated by illumination source 42 appropriately to be captured by camera system 44.

Camera system 44 can be operably coupled to a processing device 50 that is configured to control the operation of camera system 44, and also to receive and process image data captured by camera system 44. In particular, processing device 50 can be configured to analyze and/or interpret the image data captured by camera system 44 in order to measure the contact angle 34 formed by each of the one or more drops 32 on surface 26.

Also shown as incorporated into contact angle measurement device 30 is a controller 52. Controller 52 may be coupled to each drop generator 38, illumination source 42, camera system 44, and processing device 50, and may be configured to control the operation of any or all of these apparatus components. In the case of camera system 44, controller 52 may control the operation of the camera system by controlling processing device 50.

Each of processing device 50 and controller 52 can be, or include, one or more chips including integrated circuits, such as a microcontroller. Alternatively, or in addition, one or both of processing device 50 and controller 52 can be separate from housing 36, as in the case where contact angle measurement device 30 is coupled to, and operated by, a remote computer. Where contact angle measurement device 30 is operated remotely, or relies upon external data processing, device 30 can be coupled to the remote computer or server via any suitable communication method, including a wired connection, or a wireless connection such as a wi-fi network, a BLUETOOTH connection, and the like. Alternatively or in addition, contact angle measurement device 30 can be coupled to, and in communication with, an external network such as a Local Area Network (LAN) and/or the Internet.

Figure 5:
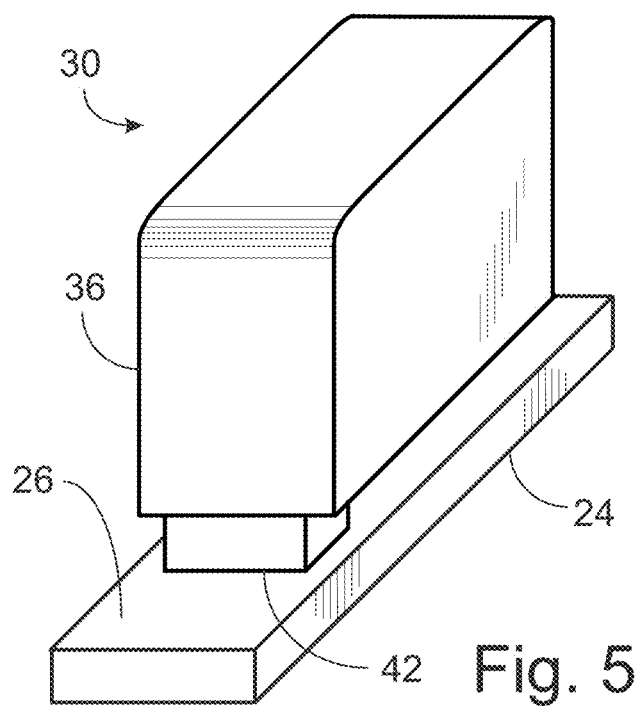
FIG. 5 is a semi-schematic illustration of an exemplary contact angle measurement apparatus in combination with a sampling substrate according to the present disclosure.
Figure 6:
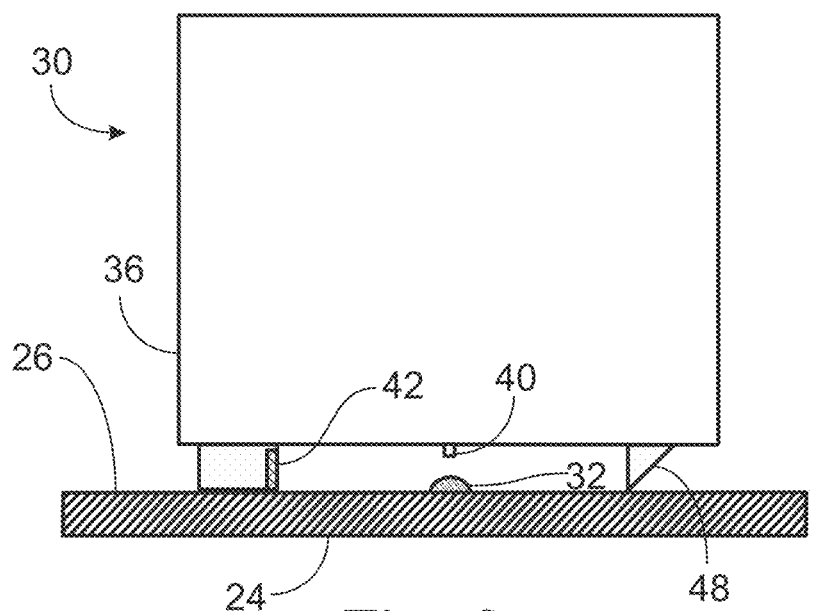
FIG. 6 is a side view of the exemplary contact angle measurement apparatus and sampling substrate of FIG. 5.

FIG. 5 provides a simplified view of a portable contact angle measurement device 30 resting upon sampling substrate 24 in an appropriate position to determine the surface energy of surface 26 of sampling substrate 24. A simplified side view of contact angle measurement device 30 resting upon sampling substrate 24 is shown in FIG. 6.

Sample Testing

Sample testing may include surface energy data collection methods that may include immersion sampling of porous, sludge or colloidal media, fluids, or vapor. Such sample testing may include measuring the initial surface energy of a sampling substrate, the insertion of a sampling substrate into the media, and a measurement of the difference in surface energy between the initial (baseline) surface energy and the post-insertion surface energy. Such measured differences may provide an indication of the presence and intensity of a amphiphilic self-assembled film on the surface of the sample substrate.

More specifically, after an initial surface energy measurement is made on a sampling substrate 24 using contact angle measurement device 30, the sampling substrate can be placed in contact with a sample medium 60 for a time sufficient for any amphiphilic compounds in the sample to interact with surface 26 of sampling substrate 24, such as by adsorbing to surface 26.

Sample medium 60 can include a solid, a liquid, and/or a gas, in any combination, such as for example a porous solid, a sludge, a colloid, a fluid, or a vapor. In particular, the sample medium 60 can be or include a porous or colloidal medium. Sample medium 60 can include an amount of material collected specifically for testing and optionally transported before testing, or sample medium 60 can be an environmental sample that is contacted with sampling substrate 24 in situ, and changes in surface energy of sampling substrate 24 are then determined onsite, or after transport of exposed sampling substrate 24 to another location. Where contact angle measurement device 30 is portable (i.e. handheld), field measurements can be facilitated, such that environmental or onsite sampling and subsequent analysis can be done on location.

In one aspect of the disclosure, a clean (or unexposed) sampling substrate 24 can simply be inserted partially or entirely into the sample medium 60. A particular sampling protocol can be used, such as optionally heating the sample in order to mobilize amphiphilic compounds in the sample medium, or maintaining the insertion of sampling substrate 24 in the sample medium for a predetermined length of time. If a sampling protocol is used, however, it should be appreciated that if the results of a plurality of tests on a plurality of samples are to be compared either with one another or with an external standard, a substantially similar protocol should be used for every sample in that plurality.

For example as shown in FIG. 6 sampling substrate 24 is shown partially inserted into a sample medium 60 that is a solid, such as a soil sample. The portion of surface 26 that was placed in contact with sample medium 60 now corresponds to a modified portion 62 of surface 26, and the portion 62 should therefore be preserved substantially without opportunities for additional contamination until surface energy measurement of modified portion 62 can be performed.

Figure 7:
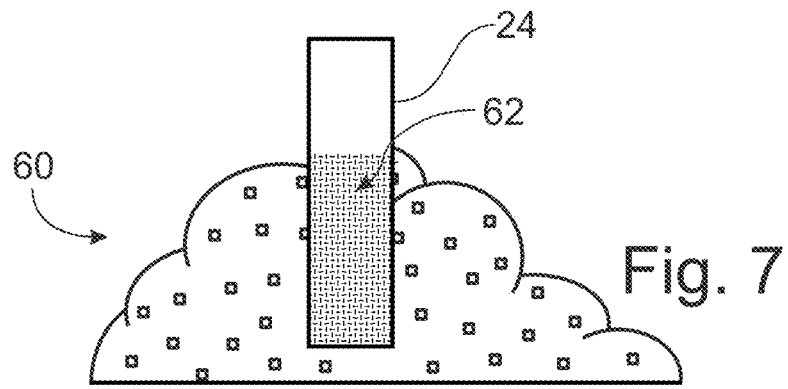
FIG. 7 is a schematic illustration of an illustrative sampling substrate inserted into a solid sample medium.

FIG. 7 depicts sampling substrate 24 partially inserted into a sample medium 60 that is a liquid or semi-liquid, such as a water sample, a soil slurry, a gel, or a colloid, among others, that may require the sample medium 60 to be retained by a container 64. Container 64 can be any appropriate container and have any geometry and/or composition that will not alter or effect the results of the surface energy measurement of modified surface portion 62 after sampling.

Figure 8:
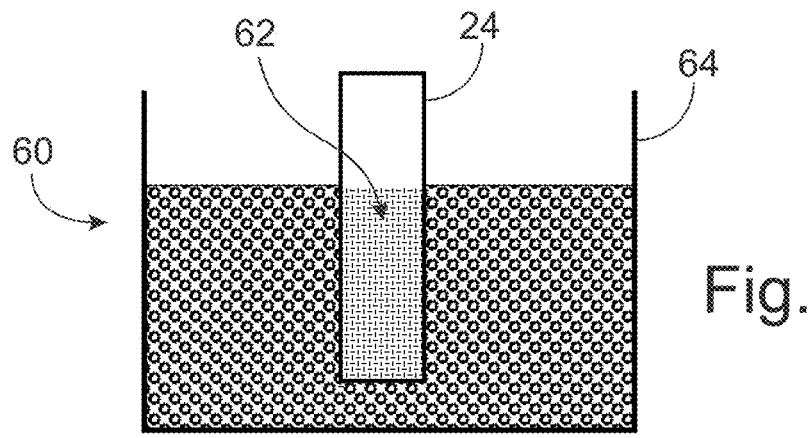
FIG. 8 is a schematic illustration of an illustrative sampling substrate inserted into a liquid or semi-liquid sample medium.
Figure 9:
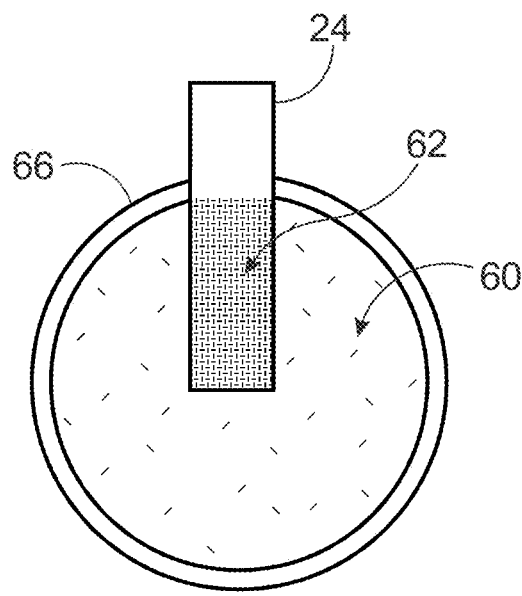
FIG. 9 is a schematic illustration of an illustrative sampling substrate inserted into a pipe carrying a gaseous sample medium.
Figure 10:
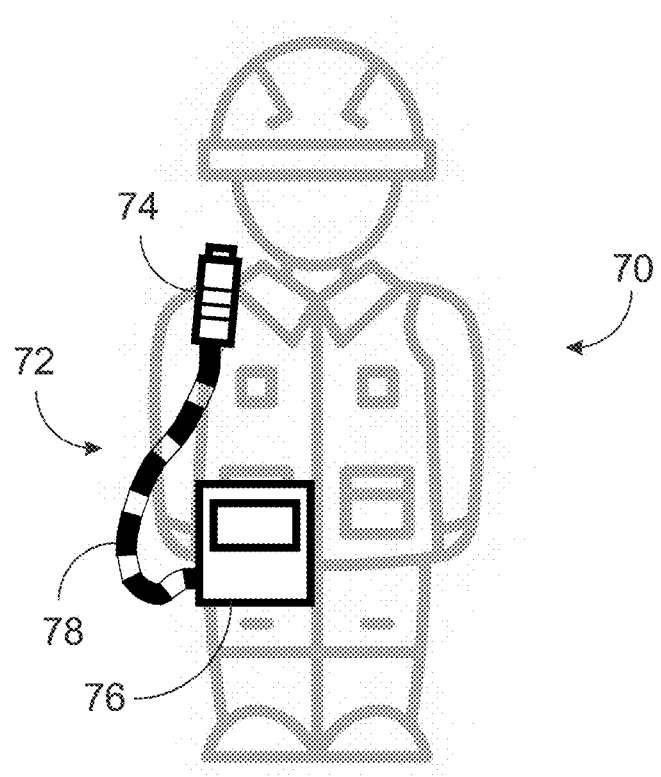
FIG. 10 is a semi-schematic illustration of a worker equipped with a personal air sampling device.

FIG. 8 depicts sampling substrate 24 partially inserted into a sample medium 60 that is a gas or vapor, and more specifically is a gas or vapor being transported within a pipe or other conduit 66. Sampling substrate 24 may be inserted into pipe 66 and left in place for a specified time before removing substrate 24 and analyzing modified portion 62 of surface 26. In another example of vapor testing, sampling substrate 24 can be placed in a sample tube and a specified volume of ambient air can be drawn through the tube and across the sampling substrate.

Where it may be desirable to determine an occupational exposure to amphiphilic compounds, such as PFAS, within a worker's breathing zone, a worker 70 may be equipped with an individual air sampling system 72 that draws air sampled by an air intake 74 placed near the worker's nose and mouth by an air pump 76 via a hose 78. The air collected by air sampling system 72 could be passed over sampling substrate 24 for a designated amount of time, such as for example a full shift for worker 70, in order to evaluate potential exposure of worker 70 to amphiphilic compounds, such as by indicating the presence of PFAS, or providing a relative PFAS concentration. Alternatively, or in addition, the presence of amphiphilic compounds in a workplace may be determined by simply exposing a sampling substrate 24 to the work environment, for example by mounting it to a wall in a work area, and testing the sampling substrate 24 later for amphiphilic compounds.

Analysis

For example, the contact angle measured on the sample substrate surface after exposure to a sample may indicate the present of a self-assembled amphiphilic film on the surface, and may further indicate the hydrophobicity of the self-assembled amphiphilic film, which may provide information as to the functional groups that may be interacting within the film.

Where the surface energy is determined using a plurality of droplets of different liquids, a measured change in the surface energy of the sample substrate may include measuring an increase or a decrease in total surface energy, and/or measuring changes in the relative contributions of the polar and dispersive portions of the surface energy.

The results collected using the presently disclosed methods may be grouped and analyzed in a variety of ways. For example, a single sample may be tested, and the detected increase or decrease in surface energy of the sample substrate may be correlated with a condition of that sample. The increase or decrease in surface energy of the sample substrate may be correlated with a presence of amphiphilic compounds in the sample. Alternatively, or in addition, the increase or decrease in surface energy of the sample substrate may be correlated with a character of the amphiphilic compounds in the sample.

Figure 11:
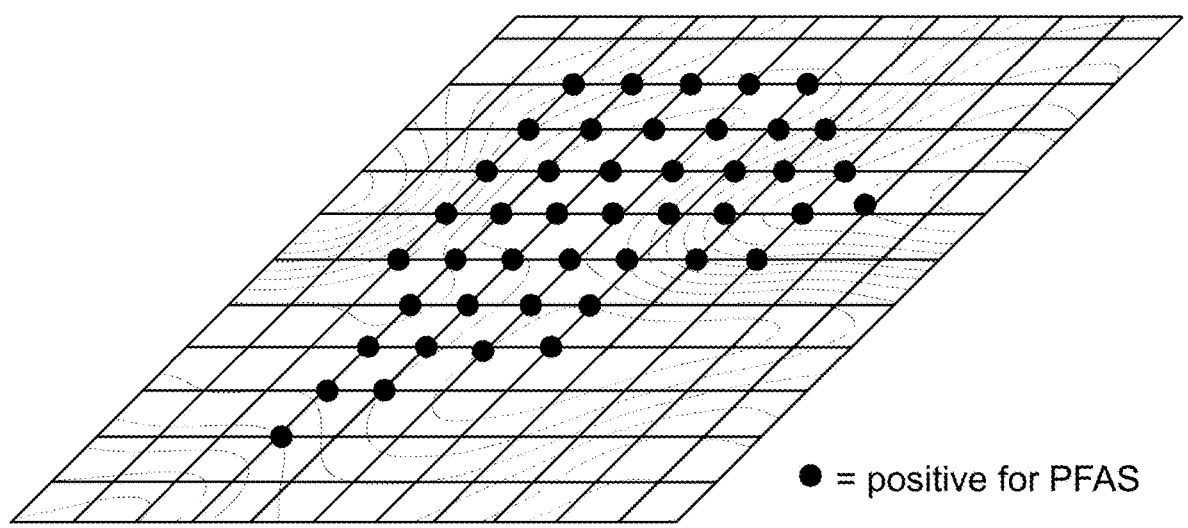
FIG. 11 is a representative illustration of contaminant mapping using the methods of the present disclosure.

Alternatively, or in addition, a plurality of individual samples may be tested, and the presence, intensity, and relative character of amphiphiles present in the samples may be assessed. More specifically, where sample origin location data is known, the presence of amphiphiles in various samples may be correlated with the presence and relative concentration of amphiphiles in those samples, and that data can be mapped onto the sample origin location data. A representative example is shown in FIG. 11, where sample original location data is plotted on a map, and the presence or absence of PFAS in the samples is marked. The location of a subsurface plume containing PFAS can then be readily visualized, and cleanup thereby facilitated.

It should be appreciated that measurement of PFAS concentration may be made once, or may be repeated over time. For example, sample testing over time early in a lifetime of an environmental exposure can provide information as to how quickly a surfactant may be moving within the sample environment.

Where a sample is or includes a liquid, particularly where the sample is an environmental sample such as subsurface water or groundwater, the surface tension of the liquid may be determined. Typically, surface tension may be measured using a tensiometer, preferably a bubble pressure tensiometer. A determination of surface tension of a liquid may provide information relating to the concentration of amphiphiles in the liquid sample. By combining measured surface tension data with surface energy measurements made using the presently disclosed methods, more detailed information can be collected related to the amphiphilic compounds present in that sample.

Alternatively, or in addition, dynamic surface tension measurements may also be performed on any given liquid sample. 'Surface age' is defined as the period of time from the initial formation of an interface to the time of surface tension observation or measurement. Where a liquid sample includes amphiphiles, such as PFAS, the determined surface tension of the sample may depend on the surface age of the interface. This allows for the measurement of time-dependent surface tension, or dynamic surface tension, in contrast to the measurement of surface tension when a system is at thermodynamic equilibrium.

The measurement of dynamic surface tension (even over fractions of a second) can provide information about how fast an amphiphilic contaminant may be moving toward a freshly created surface. This early surface age slope data may convey information as to the physical and/or chemical characteristics of the amphiphiles contained by the sample. For example, dynamic surface tension measurements that exhibit steeper slopes may indicate the movement of relatively lower molecular weight compounds, while dynamic surface tension measurement exhibiting relatively shallower slopes may indicate the movement of relatively higher molecular weight compounds.

In one aspect of the presently disclosed method, in addition to correlating surface energy measurements with location data, such as is shown in the example of FIG. 11, the surface tension or dynamic surface tension measured for a given environmental sample can also be correlated with the location data for that sample. By combining surface tension measurements, dynamic surface tension measurements, and surface energy data collected using the presently disclosed methods, not only can information relating to the presence, concentration, and/or composition of a PFAS formulation present in the environment be determined, that information can be correlated with the location of the PFAS formulation in the environment.

Assay Kits

Sample testing and analysis may be facilitated by use of a kit configured for analyzing sample media for a presence and/or character of amphiphilic compounds. Such a kit may include, for example, a plurality of sample substrates, each sample substrate having a surface capable of interacting with amphiphilic compounds in a sample medium, in order to facilitate the analysis of a plurality of samples.

As discussed above, each sample substrate may be composed of a material that provides the sample substrate with a surface suitable for self-assembly of amphiphilic layers on the surface. In one example, the sample substrates of the kit may include a metal or metal alloy. More preferably, the sample substrates may include copper metal. In particular, each sample substrate may be heat treated to create a surface layer of copper oxide. Each sample substrate may also have a physical configuration that is a rectangular prism or tablet.

The assay kits of the present disclosure may further include a surface energy measurement device configured to determine a surface energy of the surface of each of the plurality of sample substrates. The surface energy measurement device may be a contact angle measurement device configured to measure a contact angle of at least one liquid droplet on the surface of each sample substrate. More typically, the contact angle measurement device is configured to measure contact angles of a water droplet and a diiiodomethane droplet on the surface of each sample substrate.

The surface energy of each sample substrate should be determined prior to their use. Each sample substrate of the kit could then be used once for a given sample or sample location, and the surface energy of the sample substrate surface could be again determined. Each sample substrate would then be decontaminated before used to test another sample. Decontamination could include any process that substantially removes any self-assembled amphiphilic film present on the sample substrate. Before use, any decontaminated sample substrates should be contained and/or transported in a container that is inert and/or itself exhibits a low surface energy. The availability of a plurality of sample substrates in a single kit may facilitate the use of the assays of the present disclosure to create maps of amphiphilic contaminant intensity.

Conclusion

As used herein, "substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not necessarily intended to show serial or numerical limitation.

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of analyzing a sample medium, comprising:
   determining an initial surface energy of a surface of a sample substrate by measuring a contact angle of at least one liquid droplet on the surface of the sample substrate;
   exposing the sample substrate surface to a medium that contains or is suspected to contain an amphiphilic compound for a time sufficient for the amphiphilic compound to interact with the sample substrate surface;
   determining a post-exposure surface energy of the surface of the sample substrate by measuring the contact angle of at least one liquid droplet on the surface of the sample substrate;
   determining a change in surface energy of the sample substrate surface by comparing the determined initial surface energy to the determined post-exposure surface energy; and
   correlating a determined decrease in surface energy of the sample substrate surface with a presence of amphiphilic compounds in the medium.

2. The method of claim 1, further comprising determining a concentration of amphiphilic compounds in the medium from the determined decrease in surface energy of the sample substrate.

3. The method of claim 1, wherein exposing the sample substrate surface to a medium that contains or is suspected to contain an amphiphilic compound includes exposing the sample substrate surface to a medium that is an environmental sample.

4. The method of claim 1, wherein exposing the sample substrate surface to a medium that contains or is suspected to contain an amphiphilic compound includes exposing the sample substrate surface to a medium that is a porous or colloidal medium.

5. The method of claim 1, wherein determining the initial surface energy of the surface of the sample substrate includes determining a contribution of each of a polar component and a dispersive component of the initial surface energy of the sample substrate surface.

6. The method of claim 5, wherein determining the post-exposure surface energy of the surface of the sample substrate includes determining a contribution of each of a polar component and a dispersive component of the post-exposure surface energy of the sample substrate surface.

7. The method of claim 1, wherein correlating the determined decrease in surface energy of the sample substrate surface with the presence of amphiphilic compounds in the medium includes correlating the determined decrease in surface energy of the sample substrate surface with a presence of amphiphilic compounds in the medium that include one or more PFAS.

8. The method of claim 7, wherein determining the post-exposure surface energy of the surface of the sample substrate includes determining a relative PFAS concentration in a breathing zone for a worker.

9. A method of environmental mapping of PFAS contaminants, comprising:
   collecting a plurality of environmental samples, each environmental sample being associated with a location where it was collected, and for each environmental sample:
      determining an initial surface energy of a surface of a sample substrate by measuring a contact angle of at least one liquid droplet on the surface of the sample substrate;
      exposing the sample substrate surface to the environmental sample for a time sufficient for any amphiphilic compounds in the environmental sample to interact with the sample substrate surface;
      determining a post-exposure surface energy of the surface of the sample substrate by measuring the contact angle of at least one liquid droplet on the surface of the sample substrate;
      determining a change in surface energy of the sample substrate surface by comparing the determined initial surface energy to the determined postexposure surface energy;
      correlating a determined decrease in surface energy of the sample substrate surface with a presence of amphiphilic compounds in the environmental sample; and
   correlating the presence of amphiphilic compounds in each of the plurality of environmental samples with the location where that environmental sample was collected to map a presence of the amphiphilic compounds in those locations.

10. The method of claim 9, wherein the presence of amphiphilic compounds in each of the plurality of environmental samples corresponds to a presence of PFAS in each of the plurality of environmental samples; and
   correlating the presence of amphiphilic compounds in each of the plurality of environmental samples with the location where that environmental sample was collected yields a map of a presence of PFAS contaminants in those locations.

11. The method of claim 9, further comprising measuring a surface tension and/or a dynamic surface tension for each of the plurality of environmental samples.

12. The method of claim 11, wherein measuring the dynamic surface tension for each of the plurality of samples includes measuring early surface age slope data for each of the plurality of samples.

13. The method of claim 11, wherein correlating the presence and/or character of amphiphilic compounds in each of the plurality of environmental samples with the location where that environmental sample was collected to map the presence and/or character of the amphiphilic compounds in those locations includes mapping the measured surface tension and/or dynamic surface tension of each environmental sample with the location where that environmental sample was collected.

* * * * *